(12) United States Patent
Wind et al.

(10) Patent No.: US 10,730,230 B2
(45) Date of Patent: Aug. 4, 2020

(54) METHOD FOR CURING A LINER TUBE

(71) Applicant: SML Verwaltungs GmbH, Rohrbach (DE)

(72) Inventors: Herbert Wind, Alsbersweiler (DE); Christian Noll, Limburgerhof (DE); Stefan Reichel, Bad Duerkheim (DE)

(73) Assignee: SML Verwaltungs GmbH, Rohrbach (DE)

(*) Notice: Subject to any disclaimer, the term of this patent is extended or adjusted under 35 U.S.C. 154(b) by 239 days.

(21) Appl. No.: 16/063,522

(22) PCT Filed: Dec. 19, 2016

(86) PCT No.: PCT/DE2016/100601
§ 371 (c)(1),
(2) Date: Dec. 24, 2018

(87) PCT Pub. No.: WO2017/101915
PCT Pub. Date: Jun. 22, 2017

(65) Prior Publication Data
US 2019/0118459 A1    Apr. 25, 2019

(30) Foreign Application Priority Data
Dec. 18, 2015  (DE) .................. 10 2015 122 313

(51) Int. Cl.
| | | |
|---|---|---|
| *F16L 55/18* | (2006.01) | |
| *B29C 63/34* | (2006.01) | |
| *F16L 55/165* | (2006.01) | |
| *B29C 35/00* | (2006.01) | |
| *B29C 35/08* | (2006.01) | |

(Continued)

(52) U.S. Cl.
CPC .......... *B29C 63/341* (2013.01); *B29C 35/002* (2013.01); *B29C 35/0805* (2013.01);

(Continued)

(58) Field of Classification Search
CPC ..... F16L 55/18; F16L 55/165; F16L 55/1654; B32B 41/00; B32B 37/06

(Continued)

(56) References Cited

U.S. PATENT DOCUMENTS

| | | | | |
|---|---|---|---|---|
| 8,561,662 B2* | 10/2013 | Moeskjaer | ............ | F16L 55/165 156/379.6 |
| 8,844,577 B2* | 9/2014 | Kiest, Jr. | ............... | F16L 55/265 138/98 |

(Continued)

FOREIGN PATENT DOCUMENTS

| | | |
|---|---|---|
| DE | 19817413 A1 | 10/1999 |
| DE | 102007042546 | 1/2010 |

(Continued)

OTHER PUBLICATIONS

International Search Report and Written Opinion received in connection with international application No. PCT/DE2016/100601; dated Apr. 4, 2017.

*Primary Examiner* — Patrick F Brinson
(74) *Attorney, Agent, or Firm* — The Marbury Law Group, PLLC

(57) ABSTRACT

The present invention relates to a method for rehabilitating lines, in particular sewers, shafts or the like, a curing device being activated or having been activated for curing the curable and/or curing ply, and an advancement of the curing device in the lining sleeve and in particular the power output of the curing device being controlled in an open-loop or closed-loop manner in dependence on the temperature sensed by the temperature measuring device on the outer side of the curable ply.

17 Claims, 1 Drawing Sheet

Figure 1:
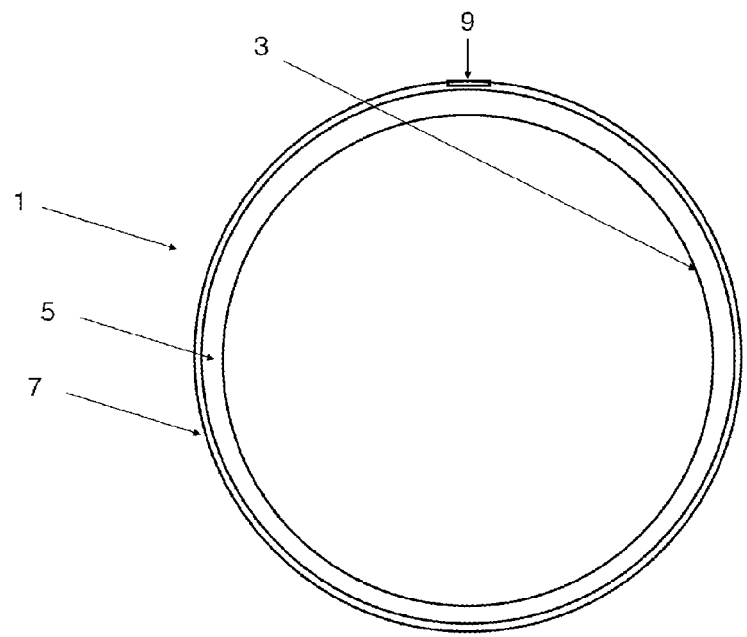

(51) Int. Cl.
  *B29L 23/00* (2006.01)
  *E03F 3/06* (2006.01)
  *F16L 55/40* (2006.01)

(52) U.S. Cl.
  CPC ..... *F16L 55/1654* (2013.01); *B29L 2023/006* (2013.01); *E03F 2003/065* (2013.01); *F16L 55/1653* (2013.01); *F16L 55/18* (2013.01); *F16L 55/40* (2013.01)

(58) Field of Classification Search
  USPC ............ 138/97, 98; 405/181.1, 184.2, 150.1, 405/156, 157; 156/64, 273.7, 379.6, 378, 156/287, 293, 275.5, 294
  See application file for complete search history.

(56) References Cited

U.S. PATENT DOCUMENTS

| | | | | |
|---|---|---|---|---|
| 2006/0151037 | A1* | 7/2006 | Lepola | G21C 17/017 138/98 |
| 2010/0051168 | A1* | 3/2010 | Moeskjaer | F16L 55/18 156/64 |
| 2011/0094654 | A1* | 4/2011 | Gearhart | B29C 63/0069 156/64 |
| 2011/0186203 | A1* | 8/2011 | Lindner | B32B 37/02 156/64 |
| 2012/0261050 | A1* | 10/2012 | Lindner | B32B 37/02 156/64 |
| 2014/0044426 | A1* | 2/2014 | Moeskjaer | F16L 55/165 392/415 |
| 2014/0334883 | A1* | 11/2014 | Kiest, Jr. | E02D 29/128 405/184.2 |

FOREIGN PATENT DOCUMENTS

| | | |
|---|---|---|
| DE | 102010011610 | 9/2011 |
| EP | 0023623 | 2/1981 |
| EP | 1262708 | 12/2002 |
| EP | 1959183 | 8/2008 |
| WO | WO 95/004646 | 2/1995 |
| WO | WO 00/73692 | 12/2000 |
| WO | WO 03/038331 | 5/2003 |
| WO | WO 2011/006618 | 1/2011 |

* cited by examiner

METHOD FOR CURING A LINER TUBE

RELATED APPLICATIONS

This application is a U.S. national phase entry of international application no. PCT/DE2016/100601, filed Dec. 19, 2016, which claims priority to German Patent Application No. DE 10 2015 122 313.9, filed Dec. 18, 2015, the disclosures of which are incorporated herein by reference in their entireties.

The present invention relates to a method for curing a lining sleeve.

Methods for rehabilitating line systems, in which for example liquid or gaseous media are transported, are known and widely described in the prior art.

For example, there are known methods in which the defective or damaged sections of the line system are replaced by new sections. However, this is laborious and also not always possible.

There are also known prior-art methods in which, for rehabilitating line systems, for example sewers and similar pipe systems, a flexible, curable ply impregnated with curable resin that serves as a lining sleeve and is also referred to as a liner is inserted into the line system. After insertion, the lining sleeve is expanded, so that it comes to lie closely against the inner wall of the line system. Subsequently, the resin is cured.

The production of such a lining sleeve is described for example in WO 95/04646. Such a lining sleeve usually comprises an opaque outer protective film, an inner film transmissive at least to certain wavelength ranges of electromagnetic radiation and a curable ply impregnated with a resin that is arranged between the inner film and the outer film.

The outer film sleeve is intended to prevent the resin that is used for impregnation escaping from the curable ply and getting into the environment. This presupposes good impermeability and attachment of the outer film sleeve to the resin-impregnated curable ply.

WO 00/73692 A1 discloses a lining sleeve comprising an inner film sleeve, a resin-impregnated fibre band as a curable ply and an outer sleeve, which is lined on its inner side with a nonwoven fabric.

Often, the resin-impregnated fibre band is wound in a helical and overlapping manner onto the inner sleeve of a lining sleeve to produce the same. The outer sleeve is subsequently likewise wound in a helical and overlapping manner around the resin-impregnated fibre band. Used in the prior art as curable resins are unsaturated polyester resins, vinyl ester resins or epoxy resins, which may for example be dissolved in styrene and/or an acrylate. These unsaturated polyesters or vinyl esters can be cured thermally (usually by peroxide catalysts) or by means of radiation, for example by UV light with photoinitiators, as described for example in EP-A 23623. Also possible are so-called combined curing processes, with a peroxide initiator used for the thermal curing in combination with photoinitiators, and these have proven to be advantageous in particular in the case of great wall thicknesses of the lining sleeves. A method for such so-called combined curing is described for example in EP-A 1262708. Unsaturated polyester or vinyl ester resins undergo shrinkage during the curing, which can impair the stability of the rehabilitated line system during later operation. By contrast, epoxy ester resins have better dimensional stability during curing after introduction.

To make production easier, the inner sleeve itself is in this case also wound around a winding mandrel. Alternatively, for example, WO 95/04646 discloses that a prefabricated inner film sleeve is inflated and can itself be used as a winding mandrel. Such a prefabricated inner film sleeve is in this case produced from a film band, the film edges of which are connected to one another by welding or adhesive bonding to one another in order to form the inner film sleeve.

Before curing, the lining sleeves are inserted into the line system to be rehabilitated and are inflated by means of a fluid, generally compressed air. For inflating the lining sleeve, according to the prior art compressed air is applied to one opening end of the lining sleeve and the opposite opening end of the lining sleeve is closed with a closure device, known as a packer. This closure device in this case comprises a hollow cylinder and a covering element, with which the hollow cylinder can be closed.

For curing the lining sleeve, a curing device which comprises a radiation source is inserted into it and led through the lining sleeve in order to activate or perform the curing of the curable plies of the lining sleeve with the radiation energy. Complete curing of the lining sleeves is of great importance here, i.e. a specific amount of radiation energy must be introduced into the lining sleeve at every point of it. The amount of radiation energy depends in this case on the power output of the radiation sources and the speed at which they are led through the lining sleeve.

DE19817413 A1 discloses a method for controlling the lining rate of a lining sleeve. In this case, one or more UV light sources are led through the pipe by means of a centrally guided pulling cable, whereby the resin of the curable ply of the lining sleeve is cured. The control of the speed with which the light sources are pulled is in this case performed in dependence on the temperature generated by the exothermic curing reaction at the inner surface of the sleeve. Taken along in the region of the light sources are a series of IR sensors, which are aligned at the same angle with an imaginary line—running parallel to the pulling cable—on the inner surface of the sleeve. Defined on this line are specific measuring points, the temperature at each measuring point being measured by the sensors while the sensors are being pulled past the measuring points.

Consequently, according to the prior art, it is known in principle to determine the temperature on the basis of discontinuous measuring points on the inner side of the lining sleeve, in order to control the rate of advancement of a curing device.

However, disadvantages of the known solutions are that there is no control of the rate of advancement on the basis of exact temperature measurement data, but instead measurements only take place at specific measuring points, and that measurements are taken on the inner side of the lining sleeve. Especially in the case of lining sleeves with curable plies with a relatively great diameter or with a high wall thickness, it is crucial that they cure through completely. On the basis of a temperature measurement on the inner side of a lining sleeve, it is therefore only possible to infer indirectly the curing through of the same.

Another disadvantage is that the power output of the radiation source within the line system does not necessarily take place uniformly, and consequently a temperature measurement on the inner side of the lines does not make it possible to ascertain with certainty the curing of the lining sleeves. Although a uniform power output of the radiation sources is generally achievable in the case of lines with a circular cross section, it is not for example in the case of oval or egg-shaped cross sections of the lines, since the distance of the radiation sources on the curing device from the inner wall varies along the cross section.

What is more, water deposits in the lower region of the lines can adversely influence the curing, since even with a uniform power output of the radiation sources there is uneven curing because of the water deposits.

Accordingly, the present invention was based on the object of overcoming the disadvantages of the prior art, and in particular providing a method that ensures curing of a lining sleeve with high precision, in which the emitted radiation energy is optimally controlled on the basis of measured temperature values.

This object is achieved in particular by a method for rehabilitating lines, in particular sewers, shafts or the like, comprising the following method steps, in particular in this sequence:
  a) inserting a lining sleeve into the line, the lining sleeve comprising at least one ply that can be cured and/or cures by activation and also an outer film arranged on the outside around the curable ply, the lining sleeve comprising at least one temperature measuring device that is designed and set up to measure a temperature on the outer side of the curable ply at a multiplicity of measuring points and/or continuously, and is arranged between the curable ply and the outer film and positioned on or at a distance outwardly from the outer side of the curable ply;
  b) introducing a curing device comprising a radiation source, with which the curing of the curable ply is activated, into the lining sleeve;
  c) expanding the lining sleeve, in particular by means of a fluid, preferably compressed air, so that the lining sleeve lies against the inner wall of the line;
  d) advancing the curing device through the line system, the curing device being activated or having been activated for curing the curable and/or curing ply, and the advancement of the curing device in the lining sleeve and/or the power output of the radiation source of the curing device being controlled in an open-loop or closed-loop manner in dependence on the temperature sensed by the temperature measuring device on the outer side of the curable ply.

According to the invention, it has proven advantageous to relocate the temperature measuring device for measuring the temperature from the inner side to the outer side of the curable ply of the lining sleeve. By measuring the temperature on the outer side of the lining sleeve, it can be ensured that sufficient activation of the curable ply has taken place to cure it through completely.

In this respect, it is no longer relevant whether the measurement of the curing process can be falsified by the radiation sources being at different distances depending on the cross section of the lines or water deposits in the lower region of the line, as is the case when measuring the temperature on the inner side of the lining sleeve, but instead attention is focused on whether the curing sleeve is cured through to its outer side. The reliability of the curing process is consequently optimized by the method according to the invention.

It has also been found that much improved control of the curing can take place if it is carried out on the basis of a multiplicity of measuring points or a continuous temperature measurement.

Measuring the temperature on the outer side of lining sleeves is described in principle in the prior art. However, these measurements are not performed when curing lining sleeves by means of radiation sources, but when using so-called hot water curing. In the case of hot water curing, the lining sleeve cures as a result of energy being supplied in the form of water vapour or hot water. The thermal curing of the lining sleeve and the accompanying increase in temperature is in this case generally measured and used for monitoring the curing process of the lining sleeve.

The main difference between the present method according to the invention, which provides curing of the lining sleeves by means of radiation sources, and hot water curing is thus that, in the case of hot water curing, fewer, randomly taken measurements are sufficient to adjust the temperature of the water vapour or the hot water, since this only changes gradually over the length of the lining sleeve.

The passing of a radiation source through a lining sleeve in this case requires much more exact measured values along the same for reliable curing, since the radiation energy that is respectively necessary at each point of the lining sleeve must be sufficient to cure it through.

This is achieved according to the invention by the open-loop or closed-loop control of the emitted radiation energy being performed on the basis of a multiplicity of measuring points or continuously.

It may also be provided according to one embodiment of the present invention that a display of a graphic representation of the temperature sensed by the temperature measuring device is provided on a display device, with in particular a first graphic representation for a first temperature being displayed in the case where the lining sleeve is not yet cured and a second graphic representation being displayed if the lining sleeve is cured.

Particularly advantageously, a graphic representation of the temperature at each measuring point of the multiplicity of measuring points is displayed, particularly advantageously of those measuring points in the active range of the curing device and/or around the active range of the curing device.

It has been found that it is easier for an operator to comprehend a graphic representation of the temperature as an indication that curing has taken place than to revert to the temperature values themselves that have been measured. The necessary temperature on the outer side depends on various factors, for example the thickness of the lining sleeve, the resins used, etc. A graphic representation, for example in the form of an indication in colour of "red" for not yet cured and of "green" for a cured section, allows improved comprehension of the state of the lining sleeve.

It may in this case be provided particularly advantageously that the graphic representation takes place in sections, in particular in or around the active range of the curing device. In particular in the case of long lining sleeves, the section relevant to the user can consequently always be displayed in a desired size.

It may in this case of course be provided that the corresponding measured values are logged, in order to save a record of the curing process and the successful curing.

It may in this case be preferred that a user controls the rate of advancement and/or the power output of the radiation source on the basis of the at least one graphic representation.

It may also be provided that a control device automatically controls the rate of advancement of the curing device through the lining sleeve and/or the power output of the curing device on the basis of the temperature sensed by the temperature measuring device.

Automatic advancing of the activated curing device, with the advancement of the curing device in the lining sleeve and/or the power output of the curing device being controlled in an open-loop or closed-loop manner in dependence on the temperature sensed by the temperature measuring device on the outer side of the curable ply, is advantageous in comparison with the solutions known from the prior art. Such automatic advancing may in this case be performed by the cables that are generally used, in particular comprising Kevlar fibres and/or at least one pulling rope, and/or pulling ropes, with in this case the pulling speed being controlled on the basis of the measured temperature values that are sensed, but it is also alternatively or additionally possible to use curing devices which comprise a driving device of their own, the advancement of which is adjusted by the measured temperature values that are sensed. It is in this case provided in particular that upper and lower threshold values are defined or definable, the advancement of the curing device being accelerated and/or the power output of the curing device reduced if the temperature reaches or exceeds an upper threshold value and the advancement of the curing device being reduced and/or the power output of the curing device increased if it reaches or goes below a lower threshold value.

According to the invention, it may be provided that the curing device comprises as a radiation source a gas discharge lamp, a short arc lamp, a stroboscope lamp, a flash lamp, light-emitting diodes (LEDs), an arc lamp, in particular a xenon lamp, and/or a mercury-xenon lamp, the lighting means in particular providing or being able to provide at least ten percent (10%), preferably at least fifty percent (50%), of the radiation energy in a wavelength range from 351 to 800 nm, in particular in a range from 380 nm to 800 nm, in particular in a range from 380 nm to 700 nm, preferably in a range from 390 nm to 470 nm, or in a range from 400 nm to 800 nm.

The lining sleeves generally have as the curable and/or curing ply one or more fibre bands that are impregnated with a curable resin. Suitable in this case in principle as fibre bands are all products known to a person skilled in the art in the form of woven, knitted or laid fabrics, mats or nonwovens, which may contain fibres in the form of long continuous fibres or short fibres. Corresponding products are known per se to a person skilled in the art and are commercially available in great variety from various manufacturers. Such lining sleeves can be optimally cured with radiation sources according to the invention.

Within the scope of the present invention, fibre bands in the context of the invention should also be understood as including felts. A felt is a sheet-like formation comprising a disordered fibrous material that can only be separated with difficulty. In principle, felts are consequently non-woven textiles. Felts are generally produced from man-made fibres and vegetable fibres by dry needle punching (known as needle felts) or by consolidation with water jets emerging at high pressure from a nozzle bar. The individual fibres in the felt are entangled with one another in a disordered arrangement. Felts have good temperature resistance and are generally moisture-repellent, which may be of advantage when they are used in liquid-carrying systems.

The length of the fibres used is not subject to any particular restriction, i.e. both so-called long fibres and also short fibres or fibre fragments can be used. The properties of the corresponding fibre bands can also be set and controlled over wide ranges by the length of the fibres used.

The type of fibres used is also not subject to any restriction. Mentioned here just by way of example are glass fibres, carbon fibres or synthetic fibres such as aramid fibres or fibres of thermoplastics such as polyesters or polyamides or polyolefins (for example polypropylene), which are known along with their properties to a person skilled in the art and are commercially available in great variety. For economic reasons, glass fibres are generally preferred; if, however, a particular heat resistance for example is of importance, it is possible to use for example aramid fibres or carbon fibres, which can offer advantages in comparison with glass fibres with regard to strength at higher temperatures.

The lining sleeves may contain one or more fibre bands, which may also be the same or different. Further suitable combinations of multiple fibre bands are described in WO 2011/006618, to the full content of which reference is made at this point. WO 2003/038331 also describes fibre bands or endless materials of a suitable construction.

According to one embodiment, it may also be provided that a measuring of the temperature by means of the temperature measuring device is performed by means of at least one temperature measuring element, which extends along the longitudinal direction of the lining sleeve, in particular from one opening-side end of the lining sleeve to an opposite opening-side end of the lining sleeve, so that a temperature is sensed on the outer side of the curable ply, at least in certain regions, along the entire length of the lining sleeve and/or the temperature measuring device comprises at least two, in particular n, temperature measuring elements, where n=1, 2, 3, 4, 5, 6, 7, 8, 9, 10 or more, which are arranged at a distance from one another along the longitudinal direction of the lining sleeve, in particular at regular intervals, each of the at least two temperature measuring elements sensing or being able to sense the temperature on the outer side of the curable ply along a longitudinal section of the lining sleeve, and in particular the temperature measuring device being integrated in the lining sleeve, preferably between the outer side of the curable ply and an outer protective film.

A temperature measuring element according to the invention that extends along the entire length of the lining sleeve allows a precise control of the power output and/or the advancing rate of the curing device along the complete lining sleeve to be performed. Alternatively, it may also be provided that a sensing of the temperature is performed at specific measuring points or measuring regions, which are arranged at a distance from one another in the longitudinal direction along the lining sleeve. In this case it may be provided according to the invention that the temperature measuring device or at least one of the temperature measuring elements is integrated in the lining sleeve, preferably between the curable ply and an outer protective film. Alternatively or in addition, it may also be provided that, before the lining sleeve is drawn into the line to be rehabilitated, the temperature measuring device is introduced into the line, for example by temperature measuring elements being attached to the inner side of the line to be rehabilitated by means of adhesive bonding, screwing, tacking and the like.

It may in this case be preferred that the temperature measuring element takes the form of a cable, in particular the form of a ribbon cable, preferably comprising a fibre-optic sensor.

A ribbon cable has the advantage in particular that it can be easily placed onto the curable ply of the lining sleeve. This can be performed with simple means during the production of the lining sleeve. A ribbon cable has the advantage in this case that it can at the same time be introduced in one piece and does not cause any great difference in height in relation to the surrounding lining sleeve. Such a small difference in height has the advantage in particular that the cable does not adversely influence drawing in of the lining sleeve into a line by the sensor unit being caught in unevennesses of the line. The risk of damage is also reduced.

Furthermore, a ribbon cable has the advantage that, as long as the actual sensor unit is arranged in the neutral phase of the ribbon cable, it protects the sensor unit from being damaged when the lining cable is folded. For being transported, it is laid in a meandering form in boxes, respectively necessitating 180° bends of the sleeve. A sensor unit arranged in the neutral phase of a ribbon cable is in this case only subjected to small flexural loads and is not damaged. It is also advantageous that, by contrast with a round cable, the risk of torsion in the longitudinal direction is reduced and the position of the measuring sensor unit in the ribbon cable can be fixed.

According to the invention, it may likewise be preferred in this case that the ribbon cable forms an optical sensor cable, which comprises a cable core and a cable sheath, the cable core comprising an optical waveguide which conducts light at a wavelength in a range from 200 to 480 nm and has a coating which is transparent to light at a wavelength in a range from 200 to 480 nm and couples in light that is radiated in through the sheath and passes it on in the longitudinal direction, and the cable sheath forming a cross-sectionally flat profiled body, into which the optical waveguide in the neutral phase of the cable sheath is introduced, and the cable sheath having a transparent region, which is light-transmissive, designed and set up to pass on light from the outer side of the cable sheath to the optical waveguide.

It may in this case be provided that the optical waveguide comprises a core of quartz, a cladding of fluorine-doped quartz and a coating of a plastic.

It may also be provided that the cable core comprises a second optical waveguide, in particular at a distance from the first optical waveguide that is designed and set up for sensing the Raman scattering in a fibre-optic measuring process, in particular comprising a germanium-doped fibre core.

Alternatively, it may be provided that the temperature measuring device comprises an optical waveguide that is designed and set up for sensing the Raman scattering in a fibre-optic measuring process, in particular comprising a germanium-doped fibre core.

Both the first optical waveguide and the second optical waveguide may be introduced loosely, as a hollow-conductor structure, or with a transparent casing. Optical waveguides with a core diameter in a range from 50 μm to 200 μm, in particular of 110 μm, have proven to be advantageous. In this case, the optical waveguides have a core of ultrapure quartz, a cladding of fluorine-doped quartz and a coating of a transparent plastic. The refractive index of such an optical waveguide is usually N=1.46 for the core and a lower refractive index than 1.46 for the cladding. The profiled body is in this case designed and set up in such a way that it is rupture-resistant under bending with a deflection of 180°.

The first optical waveguide in this case lies in the transparent region, while the second optical waveguide is arranged outside the transparent region. Preferably, the second region is coloured, that is to say is not transparent. In this case, the second optical waveguide is an optical waveguide with fibre optics suitable for temperature measurement and with spatial resolution suitable for temperature measurement.

It may also be provided that a transmission of measured temperature values of the temperature measuring element to an evaluation device is performed by means of an RFID transponder, the evaluation device controlling the advancement and/or the power output of the curing device in an open-loop or closed-loop manner.

This has proven to be advantageous in particular to allow temperature measuring elements to be integrated as passive elements in a lining sleeve, it being possible to dispense with electrical connection lines led through the lining sleeve.

In particular, it may be advantageous that a measuring of the temperature by means of the temperature measuring device is performed by means of a temperature measuring element, which comprises piezoelectric crystals of quartz and/or lithium niobate with lithographically applied electrode structures which convert an incoming radio signal into a surface wave that propagates via the crystal, and the reflected surface waves being convertible back or being converted back into an electrical signal, a temperature change leading to a defined detectable change in the reflected signal, so that as a reaction to an enquiring pulse and the pulse response a temperature measurement can be performed or is performed.

This configuration has the advantage in particular that there is a purely passive component which can be read by the enquiring pulse and the evaluation of the pulse response, without there having to be an own energy supply, integrated in the temperature measuring element, or an external energy supply. The temperature measuring elements according to the invention, which are also known by the term "surface acoustic wave" (SAW) transponders, can in this case operate at high temperatures (400° C.) and have very fast reaction times in the range of microseconds. Consequently, the temperature measuring elements according to the invention can be positioned at the desired locations of a lining sleeve without cabling of the same taking place, these elements having a fast reaction rate along with a high temperature resistance.

According to one embodiment of the invention, it may also be provided that at least a first threshold value for a first temperature is defined and at least a second threshold value, higher than the first threshold value, for a second temperature is defined, wherein a rate of advancement of the curing device through the lining sleeve is reduced if the temperature is below the first threshold value and is increased if the temperature is above the second limit value and/or the power output of the curing device is increased if the temperature is below the first limit value and reduced if the temperature is above the second limit value.

It may be advantageous in this respect that the threshold values are fixed in dependence on the lining sleeve to be cured, in particular in dependence on the diameter of the ply of the lining sleeve that is to be cured.

Defined threshold values allow optimized curing to be ensured. It may in this case also be provided that the threshold values are adapted to the specific properties of the lining sleeves specifically to be cured. It may in this case also be provided that the first threshold value may be identical to the second threshold value.

Finally, it may also be provided that an advancing of the curing device is performed by means of a cable, in particular a cable comprising Kevlar fibres and/or at least one pulling rope, and/or pulling ropes, in particular at a rate of advancement in a range from 5 cm/min to 200 cm/min.

Further features and advantages of the invention emerge from the following description, in which exemplary embodiments of the invention is explained by way of example on the basis of schematic drawings, without thereby restricting the invention.

Figure 2:
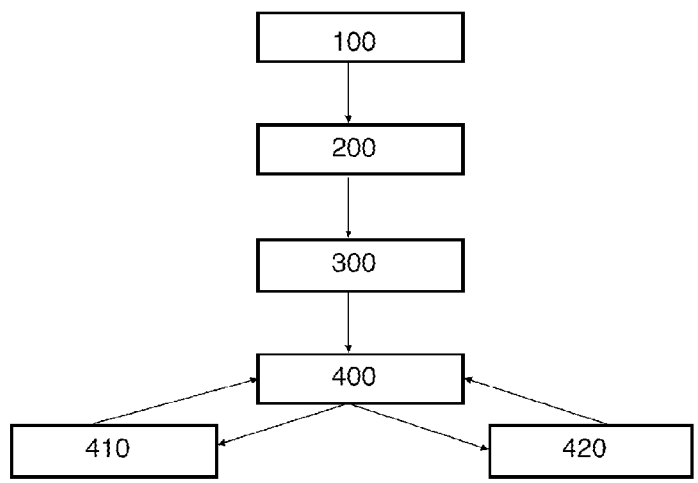

In the figures:

FIG. 1 shows a schematic sectional view of a lining sleeve according to the invention; and FIG. 2 shows a schematic view of a flow diagram of a method according to the invention.

FIG. 1 shows a lining sleeve 1 according to the invention with an inner film 3, a curable ply 5 and also an outer film 7. Between the outer film 7 and the curable ply 5, a temperature measuring device 9 is arranged.

In FIG. 2, a schematic flow diagram of a method according to the invention is shown. In a first step 100, a lining sleeve according to the invention is inserted into a line to be rehabilitated. In the subsequent method step 200, the curing device is introduced into the lining sleeve. After introducing the curing device, pressure is applied to the lining sleeve in a method step 300, so that it comes to lie against the walls of the line to be rehabilitated. In a method step 400, the advancement of the curing device in the lining sleeve and/or the power output of the curing device is controlled in an open-loop or closed-loop manner in dependence on the temperature sensed by the temperature measuring device on the outer side of the curable ply. If the measured temperature is higher than a first threshold value, in a step 410 the rate of advancement of the curing device is increased and/or the power output of the radiation source is reduced. If the measured temperature is lower than a second threshold value, in a step 420 the rate of advancement of the curing device is reduced and/or the power output of the radiation source is increased.

The features of the invention disclosed in the foregoing description and the claims may be essential both individually and in any desired combination for implementing the invention in its various embodiments.

The invention claimed is:

1. Method for rehabilitating lines, in particular sewers, shafts or the like, comprising the following method steps, in particular in this sequence:
  a) inserting a lining sleeve into the line, the lining sleeve comprising at least one ply that can be cured and/or cures by activation and also an outer film arranged on the outside around the curable ply, the lining sleeve comprising at least one temperature measuring device that is designed and set up to measure a temperature on the outer side of the curable ply at a multiplicity of measuring points and/or continuously, and is arranged between the curable ply and the outer film and positioned on or at a distance outwardly from the outer side of the curable ply;
  b) introducing a curing device comprising a radiation source, with which the curing of the curable ply is activated, into the lining sleeve;
  c) expanding the lining sleeve, in particular by means of a fluid, preferably compressed air, so that the lining sleeve lies against the inner wall of the line;
  d) advancing the curing device through the line system, the curing device being activated or having been activated for curing the curable and/or curing ply, and the advancement of the curing device in the lining sleeve and/or the power output of the radiation source of the curing device being controlled in an open-loop or closed-loop manner in dependence on the temperature sensed by the temperature measuring device on the outer side of the curable ply.

2. Method according to claim 1, wherein the display of a graphic representation of the temperature sensed by the temperature measuring device on a display device, with in particular a first graphic representation for a first temperature being displayed in the case where the lining sleeve is not yet cured and a second graphic representation being displayed if the lining sleeve is cured.

3. Method according to claim 2, wherein a graphic representation of the temperature at each measuring point of the multiplicity of measuring points is displayed, in particular of those measuring points in the active range of the curing device and/or around the active range of the curing device.

4. Method according to claim 2, wherein a user controls the rate of advancement and/or the power output of the radiation source on the basis of the at least one graphic representation.

5. Method according to claim 1, wherein a control device automatically controls the rate of advancement of the curing device through the lining sleeve and/or the power output of the curing device on the basis of the temperature sensed by the temperature measuring device.

6. Method according to claim 1, wherein the curing device comprises as a radiation source a gas discharge lamp, a short arc lamp, a stroboscope lamp, a flash lamp, light-emitting diodes (LEDs), an arc lamp, in particular a xenon lamp, and/or a mercury-xenon lamp, the lighting means in particular providing or being able to provide at least ten percent (10%), in particular at least fifty percent (50%), of the radiation energy in a wavelength range from 351 to 800 nm, in particular in a range from 380 nm to 800 nm, in particular in a range from 380 nm to 700 nm, preferably in a range from 390 nm to 470 nm, or in a range from 400 nm to 800 nm.

7. Method according to claim 1, wherein measuring of the temperature by means of the temperature measuring device by means of at least one temperature measuring element, which extends along the longitudinal direction of the lining sleeve, in particular from one opening-side end of the lining sleeve to an opposite opening-side end of the lining sleeve, so that a temperature is sensed on the outer side of the curable ply, at least in certain regions, along the entire length of the lining sleeve and/or the temperature measuring device comprises at least two, in particular n, temperature measuring elements, where n=1, 2, 3, 4, 5, 6, 7, 8, 9, 10 or more, which are arranged at a distance from one another along the longitudinal direction of the lining sleeve, in particular at regular intervals, each of the at least two temperature measuring elements sensing or being able to sense the temperature on the outer side of the curable ply along a longitudinal section of the lining sleeve, and in particular the temperature measuring device being integrated in the lining sleeve, preferably between the outer side of the curable ply and an outer protective film.

8. Method according to claim 7, wherein the temperature measuring element takes the form of a cable, in particular the form of a ribbon cable, preferably comprising a fibre-optic sensor.

9. Method according to claim 7, wherein the ribbon cable forms an optical sensor cable, which comprises a cable core and a cable sheath, the cable core in particular comprising an optical waveguide which conducts light at a wavelength in a range from 200 to 480 nm and has a coating which is transparent to light at a wavelength in a range from 200 to 480 nm and couples in light that is radiated in through the sheath and passes it on in the longitudinal direction, and the cable sheath forming in particular a cross-sectionally flat profiled body, into which the optical waveguide in the neutral phase of the cable sheath is introduced, and the cable sheath having a transparent region, which is light-transmissive, designed and set up to pass on light from the outer side of the cable sheath to the optical waveguide.

10. Method according to claim 7, wherein the optical waveguide comprises a core of quartz, a cladding of fluorine-doped quartz and a coating of a plastic.

11. Method according to claim 7, wherein the cable core comprises a second optical waveguide, in particular at a distance from the first optical waveguide that is designed and set up for sensing the Raman scattering in a fibre-optic measuring process, in particular comprising a germanium-doped fibre core.

12. Method according to claim 1, wherein the temperature measuring device comprises an optical waveguide that is designed and set up for sensing the Raman scattering in a fibre-optic measuring process, in particular comprising a germanium-doped fibre core.

13. Method according to claim 1, wherein measured temperature values of the temperature measuring element being transmitted to an evaluation device by means of an RFID transponder, the evaluation device controlling the advancement and/or the power output of the curing device in an open-loop or closed-loop manner.

14. Method according to claim 1, wherein a measuring of the temperature by means of the temperature measuring device by means of a temperature measuring element, which comprises piezoelectric crystals of quartz and/or lithium niobate with lithographically applied electrode structures which convert an incoming radio signal into a surface wave that propagates via the crystal, and the reflected surface waves being convertible back or being converted back into an electrical signal, a temperature change leading to a defined detectable change in the reflected signal, so that as a reaction to an enquiring pulse and the pulse response a temperature measurement can be performed or is performed.

15. Method according to claim 1, wherein defining at least a first threshold value for a first temperature and at least a second threshold value, higher than the first threshold value, for a second temperature, wherein a rate of advancement of the curing device through the lining sleeve is reduced if the temperature is below the first threshold value and is increased if the temperature is above the second limit value and/or the power output of the curing device is increased if the temperature is below the first limit value and reduced if the temperature is above the second limit value.

16. Method according to claim 15, wherein the threshold values being fixed in dependence on the lining sleeve to be cured, in particular in dependence on the diameter of the ply of the lining sleeve that is to be cured.

17. Method according to claim 1, wherein advancing of the curing device by means of a cable, in particular a cable comprising Kevlar fibres and/or at least one pulling rope, and/or pulling ropes, in particular at a rate of advancement in a range from 5 cm/min to 200 cm/min.

* * * * *